W. T. SEARS.
PUNCH PRESS.
APPLICATION FILED JULY 18, 1918.
1,312,213.
Patented Aug. 5, 1919.
6 SHEETS—SHEET 1.
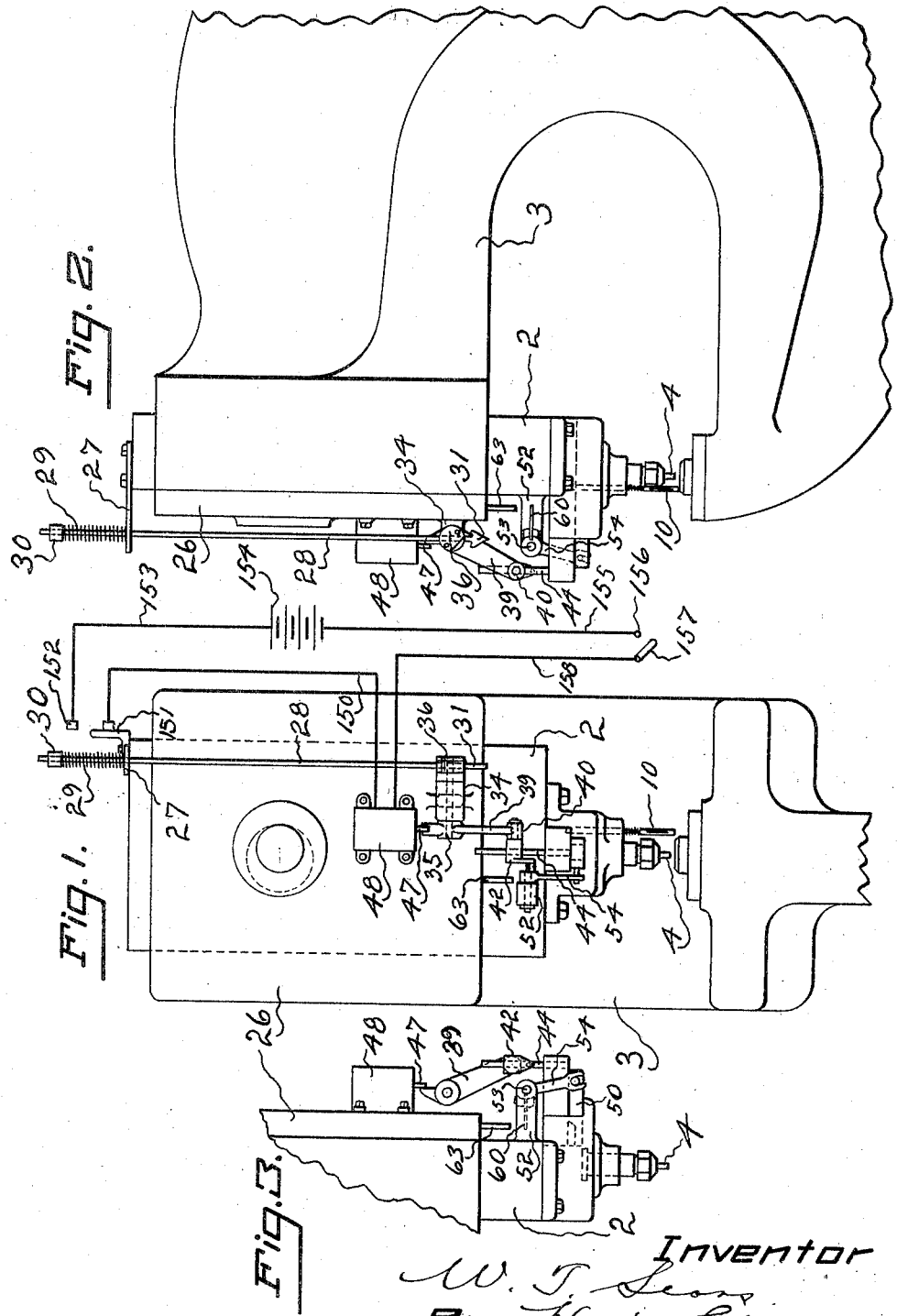

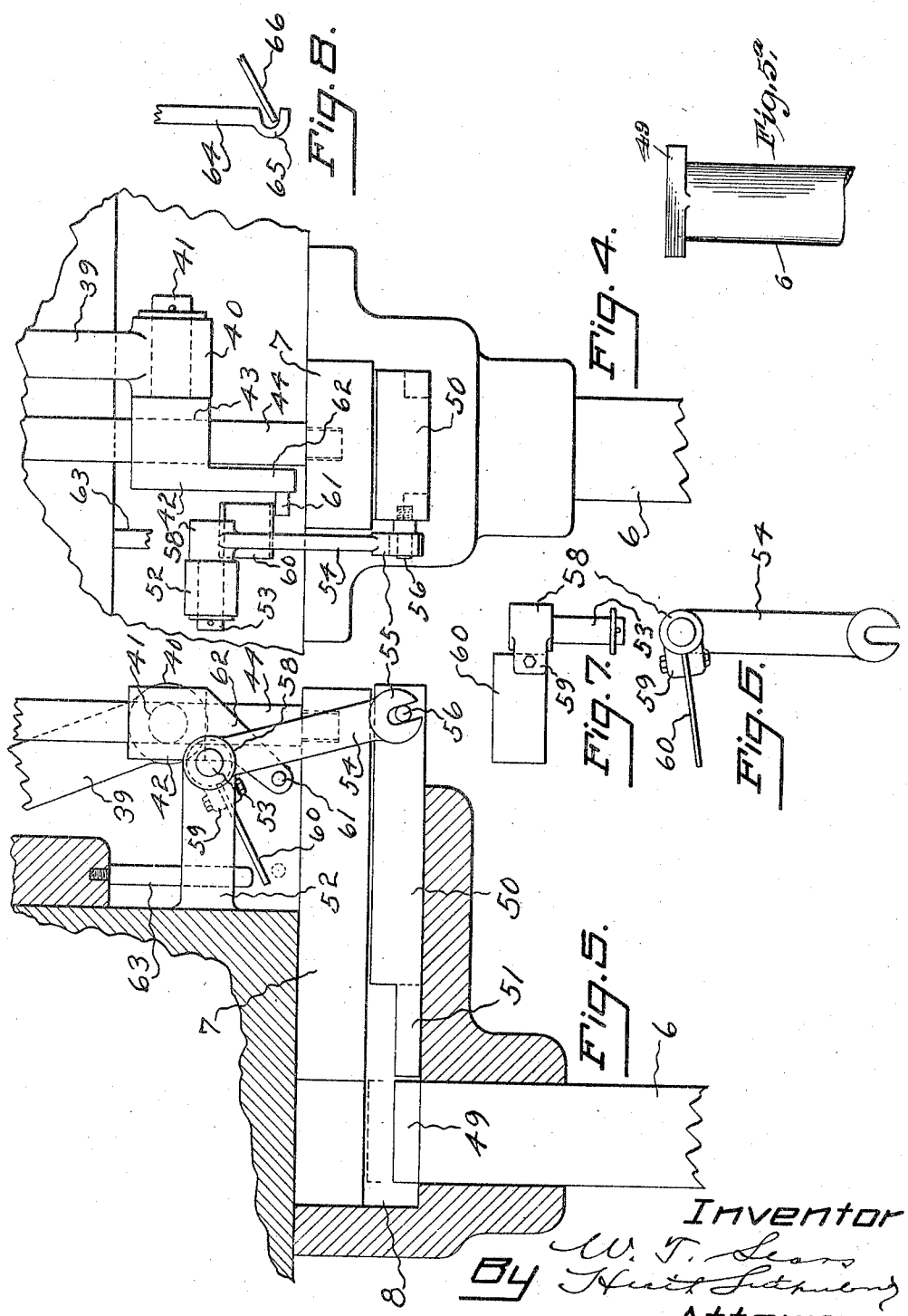

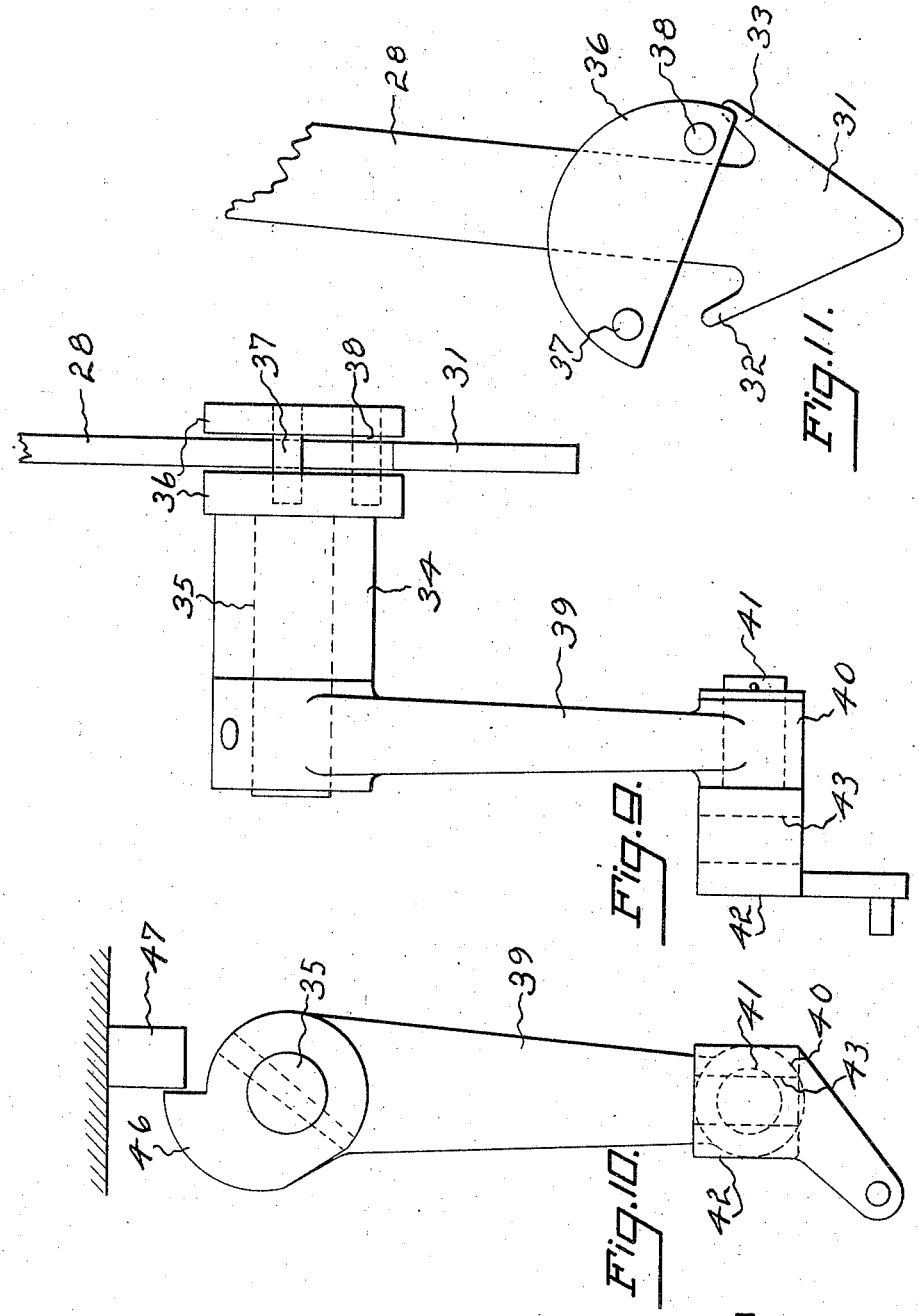

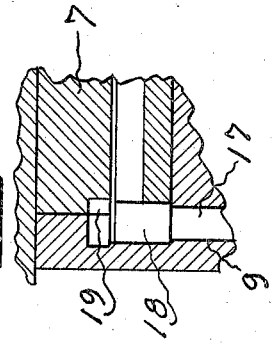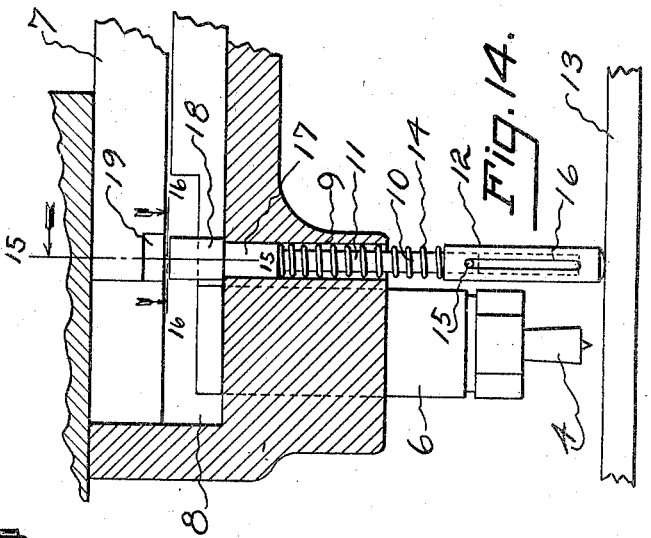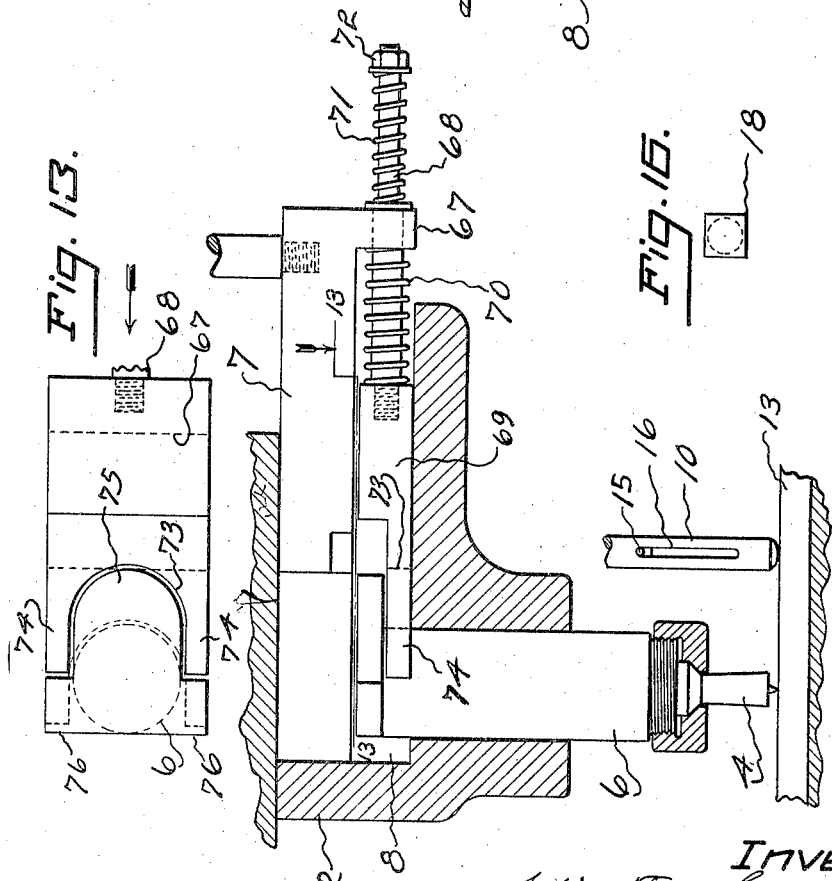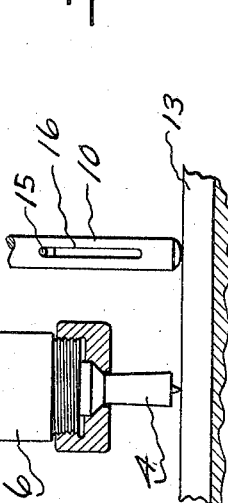

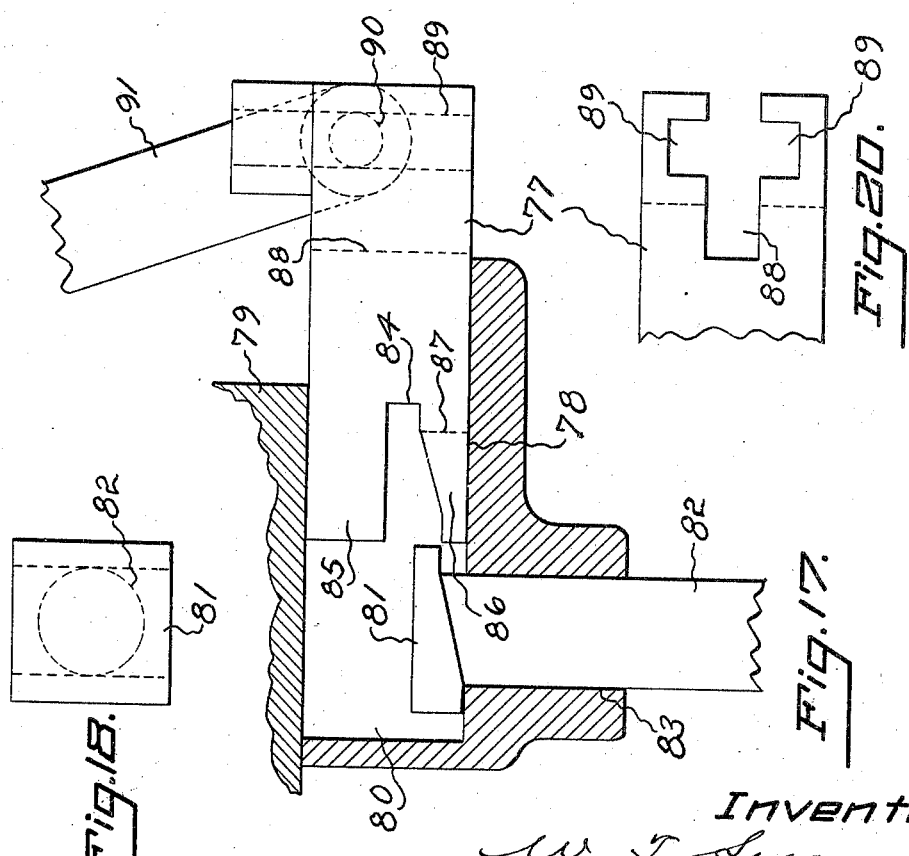

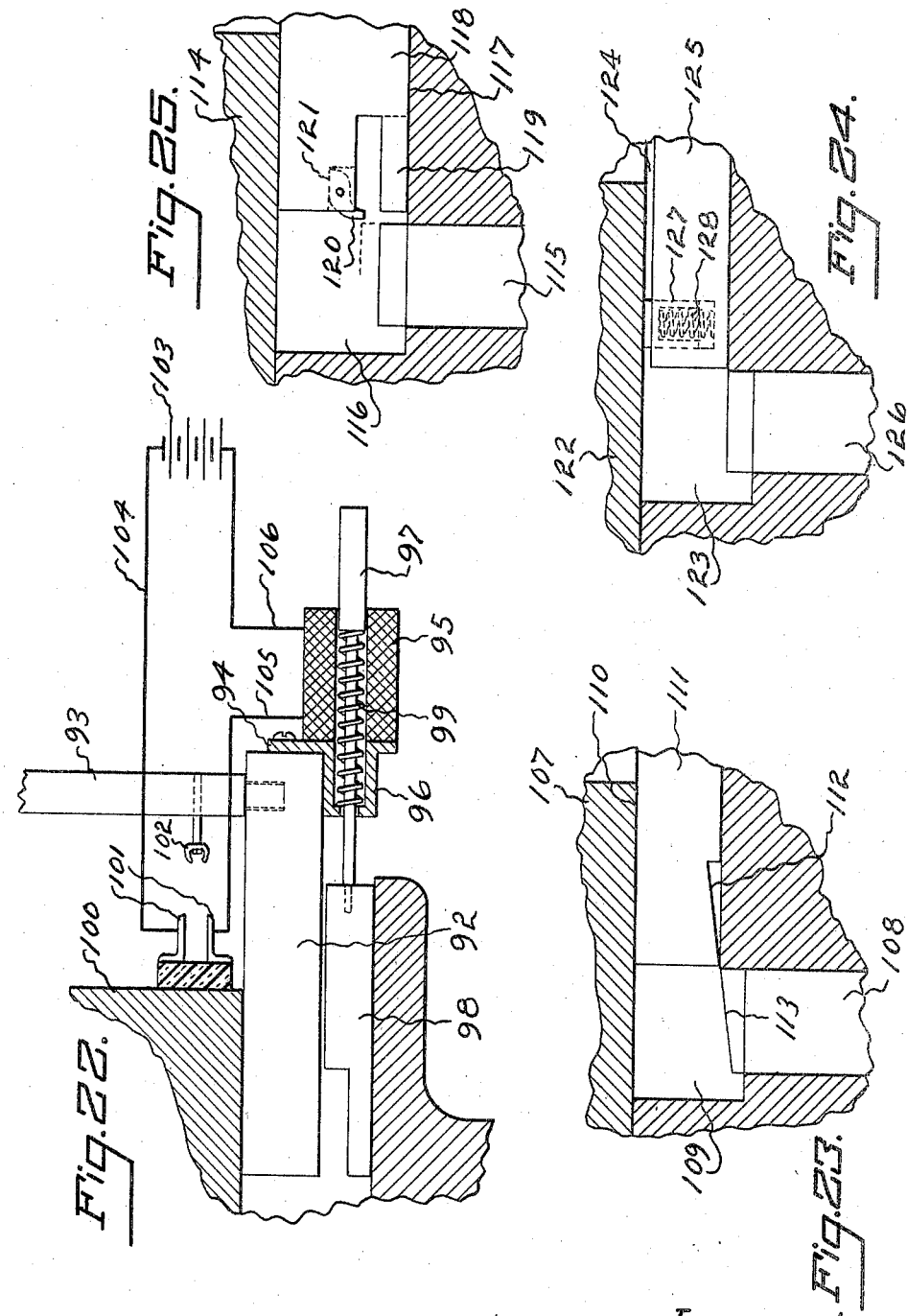

United States Patent Office.

WILLARD T. SEARS, OF NEW YORK, N. Y.

PUNCH-PRESS.

1,312,213.

Specification of Letters Patent.  Patented Aug. 5, 1919.

Application filed July 18, 1918. Serial No. 245,456.

*To all whom it may concern:*

Be it known that I, WILLARD T. SEARS, a citizen of the United States, residing at New York, in the county of New York and State of New York, have invented certain new and useful Improvements in Punch-Presses, of which the following is a specification.

This invention relates to what I shall for convenience term a punch press. It is more or less common in machines of the character set forth to provide what is known as a "gag." In the present machine I employ a gag which as to its structure and broadly speaking, mode of operation may be of any convenient nature; by mode of operation I mean that the means by which the gag is thrown into an operative position from an inoperative position may be either mechanical, electrical or both or of some other type. In this connection I might say that one of the elemental features I have in view is to provide in conjunction with such a gag, means which will positively and effectually prevent it being thrown into action or toward its operative position at a time too late to assume said operative position before the punching pressure comes upon it. Another feature I have in view is the provision of what I term a "stripper gag." This stripper gag may likewise be of any suitable construction and operated in any desirable manner. The function of the stripper gag is to effect at the proper point the separation positively of the tool or punch from the work.

In the drawings accompanying and forming part of the present specification I have shown in detail several of the many different forms of embodiment of the invention which to enable those skilled in the art to practice the same will be set forth fully in the following description. Obviously I do not restrict myself to this particular disclosure; I may depart therefrom in several respects within the scope of the invention defined by the claims following said description.

Referring to said drawings:

Figure 1 is a front elevation and

Fig. 2 a side view as seen from the right in Fig. 1 of a punch press equipped with gag mechanism involving the invention, said Fig. 2 however, omitting certain of the wiring.

Fig. 3 is a side elevation as seen from the left in said Fig. 1 of less of the machine but illustrating certain of the mechanisms.

Fig. 4 is a front elevation on a larger scale and

Fig. 5 a vertical sectional view of the two gags, part of the head of the machine and certain adjunctive devices.

Fig. 5$^a$ is a detail view of the upper portion of the stem or shank of the punch or tool, as viewed for instance from the right in Fig. 5.

Figs. 6 and 7 are side and top plan views of a lever.

Fig. 8 is a detail of a modification.

Fig. 9 is a front elevation,

Fig. 10 a side, and

Fig. 11 a like view of cerain controlling parts.

Fig. 12 is a sectional side view of a modified form.

Fig. 13 is a horizontal section on the line 13—13 of Fig. 12, looking in the direction of the arrow.

Fig. 14 is a sectional view, the section being practically at right angles.

Fig. 15 is a vertical section on the line 15—15 of Fig. 14, looking in the direction of the arrow.

Fig. 16 is a plan view, looking in the direction of the line 16—16 of Fig. 14.

Fig. 17 is a sectional side elevation of a modification.

Fig. 18 is a top plan view of the stem of the punch shown in Fig. 17.

Fig. 19 is a front elevation of the gag structure shown in Fig. 17, and

Fig. 20 is a top plan view of the outer end of the gag element.

Fig. 21 is a view corresponding practically to Fig. 17, of a further modification.

Figs. 22 to 25 inclusive are practically like views of further modifications.

Like characters refer to like parts throughout the several views which are on different scales.

It is quite common in a punch press to employ what is known as a punch or punching gag. For example in Letters Patent No. 1,074,900 granted to me October 7, 1913, I show a punch gag and means for operating the same. This punch gag may as I have already noted, be any one of several different forms, and in like fashion it can be operated in any desirable manner. As will probably be understood the purpose of this punch gag is to put the punch or tool in operative relation with a head which is generally reciprocatory. When the punch gag in effect is in operative or working relation it practically couples the punch to the head, so that at such time the head on its proper stroke usually downward, will cause the punch or tool to cut through the stock resting on the anvil or other base. It has happened that the gag prior to the present invention has been thrown toward its operative position at a time too late to completely seat itself before the punching pressure comes upon it. Such a contingency as this is at times disastrous or at least injurious to the parts. I provide, therefore, as to one of the elemental features of the invention means by which this punch or punching gag is so controlled that the punch cannot be given its complete advancing stroke after the head has passed a certain point in its movement, generally its advance. This particular control or check may be obtained in a variety of different ways, some of which I have shown rather fully and will later describe.

There is also what I have termed a "stripper gag." The latter may be operated in several different ways, and its control or government may vary. The office of the stripper gag is to effect positively the separation of the tool from the work; that is the definite detachment of these two parts so as to facilitate the output of the machine. In some cases the punch and stripper gags may be separate elements, while in others they may be carried by the same part; in the latter case the portions of the element will be operated or actuated at proper times, and this desirably automatically.

In Figs. 1 and 2 I have shown parts of a punch press of familiar kind. This includes the head 2 usually vertically reciprocative, the active or working movement of the head being as shown, downward. This head is mounted on framework such as that denoted in a general way by 3. The punch or equivalent tool carried by said head is designated by 4. These parts may in fact be like the similar parts shown in the Letters Patent already identified. Associated with the punch or tool 4 and intended to operate more properly in conjunction with the stem or shank 6 thereof, is a punch gag as 7 the two being rigid with each other. It will be evident that when the punch or punching gag 7 is "in" or in the path of movement of the punch or tool or rather of the stem or shank 6 thereof, said gag is in its operative position at which time said punch or tool will penetrate or punch through the stock on the advance of the head, whereas if said gag is back as shown for instance in Fig. 5, the punch or tool will not pass through the stock in that said punch or shank thereof will when it encounters the work telescope or pass into the chamber 8 of the head 2. In said Fig. 5 the punch gag 7 is shown in its inoperative or retracted position. When the punch gag 7, however, is advanced toward its operative position at which point its forward or inner end abuts against the rear side of the chamber 8, it will be clear that the stem or shank 6 has back of it practically a solid body, in view of which circumstance on the advance of the head 2 the punch or tool 4 will strike and then penetrate the work or stock.

The head 2 is shown provided with a vertical bore or passage 9 to receive a controller as 10, this controller when in active position preventing the advancing movement of the punch gag. The controller or locker 10 (Fig. 14) comprises two members as 11 and 12 telescopically or collapsibly associated. For instance the lower member 12 which is adapted to bear directly upon the stock or work 13 slidingly receives in a socket the cylindrically reduced portion of the upper member 11, the two parts being held distended or to maintain the elongated condition of the controller or locker 10, by a spring as 14 encircling the lower portion of the upper member 11, bearing against the upper end of the lower member and also against a shoulder on the upper member. The bore or passage 9 it will be seen, intersects the chamber 8 through which the punch gag 7 is adapted at the correct time, to move. A pin as 15 may enter a longitudinal slot as 16 intersecting the socket of the lower member 12 to provide for the relative necessary movement of the two members 11 and 12 and at the same time prevent their relative rotation. The upper portion 17 of the locker 10 is polygonal to fit the correspondingly shaped bore or passage 9 and thus prevent the locker from turning. The head of the locker is denoted by 18, and it coöperates with a notch as 19 in the forward or inner adjacent end portion of the punch gag 7.

When the parts are in their normal positions, that is when the head 2 is retracted or up and until it has advanced a certain distance, the lower end of the locker 10 is above the work 13 as shown in Fig. 1, and this lower end it will be seen extends below the lower end of the punch or tool 4. It will be supposed that the head 2 has commenced to advance, that the punch 4 is almost against the work 13 and that the attendant of the machine then attempts to advance or move to operative position the punch gag 7. This will be prevented as in the meantime the locker 10 has been so advanced or relatively moved upward that its head 18 has been projected into the notch or slot 19 and thus positively and effectually prevent the advance of the punch gag. As a matter of fact the attendant of the machine must advance the punch gag 7 immediately on or after the inception of the advance of the head for if he does not, he cannot possibly advance the punch gag, because the locker interposes a resistance to such advance of the punch gag.

In the construction which I have just described, the locking of the punch gag depends upon the surface of the plate being punched. In view of this circumstance, there will be much more time to throw "in" the gag in punching a thin plate than a thick one. I show in Fig. 21 for example an organization which acts independently of the thickness of the plate and is governed solely by the movement of the head. In this particular case the head is denoted by 20, the punch gag by 21, and the framing of the machine by 22. These parts are in fact in the present case equivalents of those already described somewhat in detail. From the rear or outer end of the punch gag 21 there extends upward the rod 23 rigid with said punch gag which as will be clear partakes of the reciprocatory movements of the head 20, the frame 22 clearly being stationary. To the upper end of this rod 23 is jointed as by pivoting the tongue 24, the mount of the tongue being such that it is free to swing upward but not downward. The frame has a projection 25 extending outwardly therefrom, the outer flat face of this projection being almost traversed by the inner face of the pivoted tongue 24 during normal action. It will be clear, therefore, that the projection 24 will act as an effectual bar or stop to prevent the advance movement of the punch gag 21 after the head 20 has traveled a short distance downwardly from the highest part of its stroke. When the head is in the highest part of the stroke the operator can advance the punch gag 21 but after said head has moved a short distance from this high point, the projection 25 will be encountered by the tongue 24, thus to effectually prevent the advance movement of the punch gag 21.

It will be evident from the foregoing description that I provide in a punch press involving a reciprocatory head and a tool loosely carried by or relatively removable with respect to the head, means for coupling or operatively associating the tool with the head, and means for preventing the coupling action or operative relation after the head has reached a certain point in its advancing movement. I have described a way of securing the important results in question. I will further set forth other ways by which this valuable and equally important function is attained.

The head 2 with which the punch or tool 4 and its stem 6 are associated, is it will be recalled reciprocatory, so that as the head moves down and up it carries therewith the punch and the gag or gags associated therewith. As a part of the frame (Figs. 1, 2 and 3 for instance) is the cover or face plate 26 which it will be understood extends across the head 2 on the front thereof and constitutes a part of the framing. To the top of this head is fastened a bar as 27 as by screws, the bar extending forwardly from the head as shown clearly in Fig. 2. Through the outer or forward end of the bar extends comparatively freely the rod 28. Surrounding the upper end of this rod is a spring as 29, the lower end of the spring acting against the bar 27 and the upper end acting against a stop such as the collar 30 on the upper end of the rod. This rod 28 slides in the bar 27 and of course moves down and up with the head 2 except when the rod meets some obstruction as I will hereinafter explain, in which event the spring 29 will be compressed owing to the fact that the head 2 is moving upward and a corresponding movement of the rod is arrested. As shown the lower end of the rod 28 terminates in a wedge-like foot 31, the upper end of which is provided with the lateral hooks 32 and 33. The frame of the machine such as the cover plate 26 thereof is shown furnished with a bearing 34 which supports the rock shaft 35, one end of which carries the spaced segments or plates 36 provided with connecting studs or pins 37 and 38 functioning as I will hereinafter explain. Said segments receive between them and thus guide the lower end of the pendent rod 28. It will be clear that as the rod 28 moves down and then up, the projections or hooks 32 and 33 will engage the pins 37 and 38 depending upon which of the pins is down. In Fig. 11 for instance the pin 38 is down, and it will therefore, be clear that on upward movement of the rod 28 with the head 2 will cause the hook 33 to engage the pin 38 and thus turn the plate or segment 36 counterwise. This will then reverse the relation. It will be understood that on the upward movement of the rod 28, the pin 38 will be moved slightly to the right and the pin 37 an equal distance to the left, so that on the next upward movement of the rod 28 the pin 37 will be operated. The result of this is that each time the head 2 moves up it will turn the plate 36 first one way and then the other. This movement if uncontrolled acting through intermediate parts would always act positively through intervening parts to throw the punch gag in at the top of one stroke and out at the top of the next stroke. It is necessary, however, to have this particular movement controlled so that the punch gag will only be thrown in when the operator desires, and this is electrically controlled. To the inner end of the rock shaft 35 is connected the pendent arm 39 so as to partake of the movement of said rock shaft. The lower end of the pendent arm has a hub 40 in which is fastened the pin 41, provided with a squared portion 42 having an opening 43 to receive the upstanding rod 44 of the punch gag 7 which as will be understood is when in its operative position, advanced to a point just back of the rear or upper end of the stem or shank 6 of the punch or tool. The hub of the upper end of the pendent arm 39 is provided with a catch or projection 46. During normal conditions this catch abuts or practically abuts against a latching member as 47 which in the present instance is the plunger of the solenoid 48 mounted in some convenient way on the cover plate 26. The latching member 47 is shown as occupying its active position in Fig. 10 and thus prevents the movement of the arm 39 in a direction to advance the punch gag 7. The arm, however, is always free to move oppositely or toward the right in Fig. 10 to throw out the punch gag.

It will be supposed that the arm 39 has been swung to the right in Fig. 10 to retract or pull out the punch gag 7 and that the solenoid plunger 47 is in the position shown in said Fig. 10. This position of the plunger or latching member 47 will prevent movement of the arm 39 in a direction to move the punch gag in. The rod 28 through the spring 29 will at the top of each stroke tend to throw through the intermediate parts the gag in. If the operator while the spring is compressed pushes a button as I will later describe which energizes the solenoid 48, the latching member or plunger 47 will be withdrawn or retracted and the punch gag 7 will be thrown in or advanced. The operator releases the push button and as a consequence the plunger drops and when on the next up stroke the gag is withdrawn it catches and holds out the punch gag until the operator or attendant again manipulates the push button. From one terminal of the solenoid 48 the wire 150 extends and leads to the contact 151 mounted on the reciprocatory head 2, said contact being coöperative with the fixed contact 152 from which the wire 153 extends and is connected to one pole of a battery or other generator 154. From the other pole of the battery the wire 155 extends and leads to the contact 156 coöperative with the circuit controller or switch 157 from which the wire 158 extends. Said wire 158 in turn is connected with the opposite terminal of the solenoid 48 from which the wire 150 leads. The switch 157 is shown in the open circuited position in Fig. 1, and in this particular view the head 2 is supposed to be on its down stroke. When the head is at the limit of its up stroke, the contact 151 will engage the contact 152, so that if at such time the switch 157 is manipulated to engage the contact 156, the solenoid 48 can be energized or electrified to function as hereinbefore explained.

I will now refer to a stripper gag alone, such for instance as is shown in Figs. 1, 2 and 3 and more in detail in Figs. 4 to 7 inclusive. The stem or shank 6 of the punch 4 has at its upper end laterally extending lugs as 49 under which the stripper gag 50 can be projected when in its active relation, the front end of said stripper gag having a reduced or stripping portion 51 for this purpose, this reduced or stripping portion being moved under the lugs 49 just about or a little after the time the punch strikes the work. On the head 2 near the lower end thereof is the bracket or bearing 52, this bracket or bearing supporting the rock shaft 53 to which is fastened the rock arm 54 having at its lower end the fork 55 constantly straddling the pin or stud 56 extending laterally from the rear or outer end of the stripper gag 50 as shown best in Fig. 5. The rock shaft 53 carries at one end the arm 54. Fixed to the other end of said rock shaft is the head 58 (Fig. 7) of the arm 54, said head having projections 59 between which is fastened the butt portion of the flat spring 60 coöperative with the stud 61 projecting from the arm 62 on the squared portion 42 already described. This spring is also intended to coöperate with the stop 63 depending from the cover plate 26. It will be clear, therefore, that the tendency is to always throw the stripper gag out or toward the right in Fig. 5 for instance at or about the top part of every upward stroke of the head 2. It will be remembered that I have referred to the fact that the punch gag 7 is operated in part through the agency of the lever 39, the punch gag being connected through the rod 44 with the squared portion 42 of the hub 40 of said pendent arm or rock lever. This provides for a sliding connection between the punch gag and the rock lever. When the punch gag 7 is advanced or thrown toward the left in Fig. 5 so as to position it over the upper end of the stem or shank 6 the pin or stud 61 will move to the dotted position in Fig. 5, and when in this position will engage the spring 60, so that as the head 2 advances or moves downward, the stripper gag will have an effect applied to it through the agency of the spring which tends to advance it or move it toward the left. The spring will give, however, until the upper end of the stem or shank 7 reaches the dotted line position in Fig. 5 at which point the reduced inner end 51 of the stripper gag 50 will be forced under the head or shoulder 49. It will be perceived, therefore, from this that the stripper gag can only be thrown in or advanced when the punch gag has been advanced, but the stripper gag will be thrown out at the top of each stroke of the head 2 irrespective of the location of the punch gag 7.

In Fig. 8 I have shown a modification of the stop or pin 63. In this case the stop is denoted by 64 and it has at its lower end the hook or bend 65 to receive the spring 66, the equivalent of the spring 60 and mounted like it. In the structure shown in Fig. 8 the stripper gag will be thrown out at the upper part of each stroke and thrown in at the lower part of each stroke, irrespective of the position of the punch gag.

Referring now to Figs. 12 and 13, in this case the head is denoted by 2, the punch or tool by 4, its stem or shank by 6 and the punch gag by 7, these parts being like those already set forth. The punch gag 7 operates like that described in connection with Figs. 1 to 7 inclusive. The punch gag 7 as shown has a depending projection 67 through which freely passes the rod 68 tapped at its inner end into the back of the stripper gag 69 practically midway of the width of the gag. The rod 68 as will be understood, is free to slide in the opening in the projection 67 through which it passes. Around the inner portion of this rod 68 is the coiled spring 70, one end bearing against the stripper gag 69 and the other against the projection 67. Around the rear portion of the rod is a second spring 71, the inner end of which bears against said projection 67 and the outer end of which bears against a stop such as a nut 72 threaded on said rod 68. The inner end of the stripper gag 69 is shown having a notch 73, this notch producing the arms 74 at opposite sides of the notch which is somewhat rounded, the arms functioning as will hereinafter appear. The stem or shank 6 has at its upper end the laterally projecting flange 75, the external shape of which is practically equivalent to the form of the notch 73. In addition to this the upper portion of said stem or shank 6 has the lateral ears 76 opposite each other and the upper and lower surfaces of which are in the plane with the corresponding surfaces of the flange 75, the latter being at right angles practically to the two ears 76.

It will be assumed that the gag 7 has been advanced in the manner already set forth. The tendency of said gag 7 on its advance is, through the intermediate parts including the spring 70, to advance the stripper gag 69. Should the parts be properly positioned therefore, it follows that the arms 74 are moved under the ears 76 on the advance of the stripper gag. As the punch gag 7 is retracted or moved toward the right in Fig. 12, the spring 71 is compressed, the stripper gag 69 remaining in its advanced position so as to effect positively the separation of the punch from the stock, and when this is done the compressed spring 71 obviously moves the stripper gag 69 from under the ears 76 until the relation of Fig. 12 is assumed. Should the punch 6 be in the position shown in said Fig. 12 on the advance of the punch gag 7, the stripper gag 69 will abut against the flange 75 and movement of the stripper gag with the punch gag will thus be prevented, the spring 70 at this time being compressed and expanding as the punch gag 7 is moved backwardly or toward the right under power.

In Figs. 17 to 20 inclusive I show a further modification which involves a combined punching and stripping gag such as 77. This part 77 functions both in the punching and stripping sections. It consists practically of a block slidable comparatively closely in a way as 78 in the reciprocatory head 79, said head having the chamber or cavity 80 intersected by the way 78 and in which is located the head 81 at the upper end of the stem or shank 82, the head normally resting on the bottom of the chamber and the shank being fitted in a bore 83 also intersecting the chamber or cavity 80. The gag or gag member has in its forward portion a slot as 84, this slot producing two branches 85 and 86 of practically similar length, the upper 85 constituting a punch gag member and the lower a stripper gag member. The lower or stripper gag member is slotted back as shown at 87, the width of the slot being sufficient to permit the branches or sides of the stripper gag member 86 to freely straddle when necessary, the upper end of the stem or shank 82. The member 77 is shown in its retracted position in Fig. 17. It has at its rear the slot 88 open at its outer end and having between its ends the lateral opposite extensions 89 which receive studs 90 at the lower end of the lever or rock arm 91 which functions exactly like the lever 39. The pins 90 being in the branches 89, the head 79 can freely descend and ascend without affecting the rock arm 91. When said rock arm is swung to the left in Fig. 17, the gag member 77 is advanced so as to move both gag portions or members 85 and 86 to their operative positions. The under wall of the slot 84 is shaped practically to agree with the under surface of the head 81, in view of which circumstance the stripper gag portion 86 can when occasion arises freely get under the head 81. When the gag 77 is advanced or moved toward the left in Fig. 17, the gag portion 85 is moved under the head, lifting it up in entering, if it is not quite in the right position, by acting against the lower inclined surface of the part 81, so as to be in correct position to strip the punch from the work at the proper point.

In Fig. 22 the punch gag is denoted by 92 and it is operated for instance exactly like that shown in Figs. 1 to 7 inclusive. Rising from the outer end of this punch gag is the arm 93 which acts precisely like the arm 62. Fastened to the outer end of said punch gag 92 is a bracket as 94 to which is united a solenoid as 95, the bracket having a tubular inward extension 96 through which the core 97 of the solenoid extends, said core at its inner end being connected rigidly with the stripper gag 98. Surrounding the core 97 is a coiled spring 99 bearing against the front end of the tubular extension and also against a shoulder or enlargement at the end of the core, the spring normally tending to hold the core retracted. On the head 100 and insulated suitably therefrom are two contacts 101 spaced to receive a circuit controller as 102 projecting from the upright arm 93. From the upper of the contacts to a battery or other source of electrical energy as 103, the wire 104 extends. From the other contact to one terminal of the solenoid the wire 105 extends, a wire as 106 leading from the other terminal of said solenoid to the opposite pole of the battery from that to which the wire 104 is connected. It will be seen that on the forward or advance movement of the gag 92 practically in the manner already described the switch or circuit controller 102 will be projected between the fixed contacts 101 and thus close the circuit of the solenoid 95 and as a consequence advance the stripper gag 98. On retractive movement of the punch gag 92 the current will not be broken until the stripper gag has moved a distance sufficient to carry the switch 102 from between the contacts 101 at which point the spring, then compressed by reaction will effect retraction of the stripper gag 98, the latter, however, having in the meantime exercised its function.

In Figs. 23, 24 and 25 I show certain modifications of safety checks. Referring first to Fig. 23 the reciprocatory head is denoted by 107 and the stem of the punch by 108. I have not deemed it necessary to show the remaining parts. In the head there is a chamber 109 intersected by the passage 110 in which the punch gag 111 is situated for sliding movement. In this particular construction the gag 111 has on its lower inner portion the inclined surface 112, the incline agreeing with that of the inclined surface 113 on the upper end of the stem or shank 108. The action in this construction is that if the punch stem commences to rise before the gag 111 commences to move, the latter movement will be at once checked. If on the other hand the punch stem commences to rise just after the punch gag starts to move in, the inclined surface 113 will relieve itself as the gag enters, so that the upward movement of the stem will not be sufficient to overtake the inclined surface 112 until the gag 111 is fully seated.

In Fig. 25 the reciprocatory head is denoted by 114 and the stem of the shank of the punch by 115, the head 114 having the chamber 116 intersected by the passage 117 in which the punch gag 118 is situated. In this case there is a stripper gag 119. The punch gag has at its forward inner portion the pawl 120 pivoted in a slot or notch therein, one end of the pawl normally extending below the forward lower end of the punch gag and the other end portion bearing against the roof or top of the slot 121 in which said pawl is pivoted. Unless the advancing movement, therefore, of the punch gag 118 commences before the punch stem 115 has been lifted enough to catch in front of the pawl, the punch gag will continue in and seat itself properly, so that the two associated with the stem or shank 115 can operate upon the work.

In Fig. 24 the reciprocatory head is denoted by 122 having a chamber 123 intersected by the passage 124 in which the punch gag 125 reciprocates, the height of the punch gag being less than the passage 124. The stem or shank of the tool is denoted by 126. In the forward upper portion of this punch gag 125 is mounted a spring plunger 127, the spring of which is denoted by 128 and which is sufficient to hold the gag 125 firmly on the lower surface of the passage 124. If the punch stem 126 rises at all before the gag commences to seat itself, it will catch, and prevent further advance movement of the gag. If, however, the gag starts first and gets part way over the stem, the lifting of the stem will take up the lost movement of the gag 125 in its passage 124, so that the gag may be properly seated before the lost movement is all utilized, and this lost movement will be sufficient to allow the gag to get fully into place.

What I claim is:

1. A punch press including a reciprocatory head, a tool and its shank rigid with each other and both loosely carried by the head, means operable at will, for putting the tool into working relation with the head, to cause the tool to punch the stock on the advance of the head, and means automatically operable independently of the movement of the tool and also of the shank which carries said tool, for positively preventing the movement of the tool into working relation with the head after the latter has reached a certain point in its advancing movement.

2. A punch press including a reciprocatory head and a tool loosely carried by the head, a gag also carried by the head and movable into position to put the tool into working relation with the head, and a member associated with the head and engaging a part fixed with respect to the head, said member being adapted to be projected across the path of movement of the gag provided said gag be not advanced, on the advance of the head.

3. A punch press including a reciprocatory head and a tool loosely carried by the head, a gag also carried by the head and having a movement into position to put the tool into working relation with the head, and a member carried by the head and engaging a part fixed with respect to the head, said member being operable by said fixed part to prevent the advance of the gag at a predetermined point in the advance of the head, provided said gag has not been advanced.

4. A punch press including a reciprocatory head and a tool loosely carried by the head, a gag also carried by the head and advanceable into position to put the tool into working relation with the head, and a telescopic member carried by the head and engaging a part fixed with respect to the head, said member being projectable across the path of advancing movement of the gag, provided said gag be not advanced, on the advance of the head.

5. A punch press including a reciprocatory head and a tool loosely carried by the head, a gag also carried by the head and advanceable into position to put the tool into working relation with the head, and a telescopic member carried by the head and engaging a part fixed with respect to the head, said member being projectable across the path of advancing movement of the gag, provided said gag be not advanced on the advance of the head, the telescopic member involving two sections and an interposed spring.

6. A punch-press including a reciprocatory head, a tool and its shank rigid with each other and both loosely carried by the head, automatic means for putting the tool into working relation with the head during a certain part of one stroke of the head and to throw it out of working relation on a certain part of the next stroke of the head, and automatic means for preventing the movement of the tool and also of the shank which carries said tool into working relation with the head after the latter has passed a certain point in its advancing movement.

7. A punch press including a reciprocatory head, a tool and its shank rigid with each other and both loosely carried by the head, means operable at will, for putting the tool into working relation with the head, to cause the tool to punch the stock on the advance of the head, means automatically operable independently of the movement of the tool and also of the shank which carries said tool, for positively preventing the movement of the tool into working relation with the head after the latter has reached a certain point in its advancing movement, a stripper gag, and means for advancing the stripper gag into position to cause the tool to be positively separated from the work after the tool has acted on the work.

8. A punch press including a reciprocatory head, a tool and its shank rigid with each other and both loosely carried by the head, means operable at will, for putting the tool into working relation with the head, to cause the tool to punch the stock on the advance of the head, means automatically operable independently of the movement of the tool and also of the shank which carries said tool, for positively preventing the movement of the tool into working relation with the head after the latter has reached a certain point in its advancing movement, a stripper gag to strip the tool from the stock, and means operable with the punch gag to bring the movement of the stripper gag into operative position.

9. A punch press including a reciprocatory head, a tool loosely associated with the head, a punch gag, means tending constantly to throw the punch gag in at the top of one stroke and out at the top of the next stroke, and means operative at will to cause the punch gag to couple the tool to the head at the end of the upper stroke of the head.

10. A punch press including a reciprocatory head, a tool loosely associated with the head, a punch gag, means tending constantly to throw the punch gag in and then out at predetermined points in the movement of the head, and means operative at will to cause the punch gag to couple the tool to the head at the end of the upper stroke of the head.

11. A punch press including a reciprocatory head, a tool loosely associated with the head, a punch gag, means tending constantly to throw the punch gag in and out at predetermined points in the stroke of the head, and electric means operative at will to cause the punch gag to couple the tool to the head at the end of the upper stroke of the head.

12. A punch press including a reciprocatory head, a tool loosely associated with the head, a punch gag, and electrical means rendered active only when the head is approximately at the limit of its restrictive stroke, for causing the punch gag to couple the tool to the head.

In testimony whereof I affix my signature in the presence of two witnesses.

WILLARD T. SEARS.

Witnesses:
EDW. L. LEEDS,
O. S. ACKLEY.